United States Patent [19]

Sarig et al.

[11] Patent Number: 4,580,397
[45] Date of Patent: Apr. 8, 1986

[54] APPARATUS FOR HARVESTING OF JOJOBA BEANS

[75] Inventors: Yoav Sarig, Ra'anana; Ofer Malkin; Friedrich Grosz, both of Holon, all of Israel

[73] Assignee: State of Israel - Ministry of Agriculture, Bet Dagan, Israel

[21] Appl. No.: 651,551

[22] Filed: Sep. 17, 1984

Related U.S. Application Data

[63] Continuation-in-part of Ser. No. 410,753, Aug. 28, 1982, abandoned.

[30] Foreign Application Priority Data

Sep. 9, 1981 [IL] Israel ........................................ 63778

[51] Int. Cl.⁴ ............................................ A01D 46/00
[52] U.S. Cl. .................................... 56/330; 56/378 R
[58] Field of Search ................... 56/336, 328 R, 327 R

[56] References Cited

U.S. PATENT DOCUMENTS

| | | | |
|---|---|---|---|
| 3,184,908 | 4/1965 | Rust | 56/330 |
| 3,522,696 | 8/1970 | Miller et al. | 56/328 R |
| 3,822,537 | 7/1974 | Sell | 56/330 |
| 4,251,983 | 2/1981 | Burton | 56/330 |

FOREIGN PATENT DOCUMENTS 671779  7/1979  U.S.S.R. .................................. 56/330

Primary Examiner—Robert P. Swiatek
Assistant Examiner—David L. Tarnoff
Attorney, Agent, or Firm—Jordan and Hamburg

[57] ABSTRACT

Apparatus for harvesting field crops such as jojoba comprising a mobile chassis, an enclosure mounted on the chassis, at least one array of radially extending tines arranged for engagement with growing plants, apparatus for rotating the at least one array, apparatus for oscillating the at least one array, and apparatus mounted on the movable chassis for collecting produce separated from the growing plants by the action of the tines in engagement therewith.

4 Claims, 7 Drawing Figures

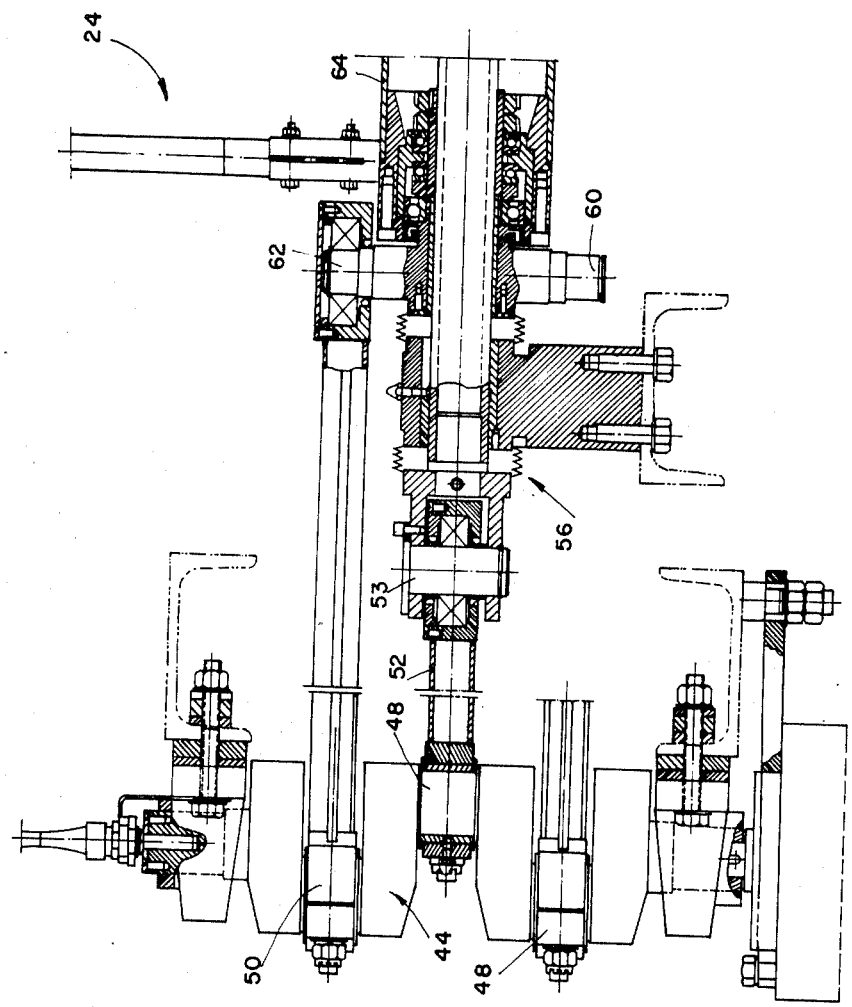
FIG. 3/1

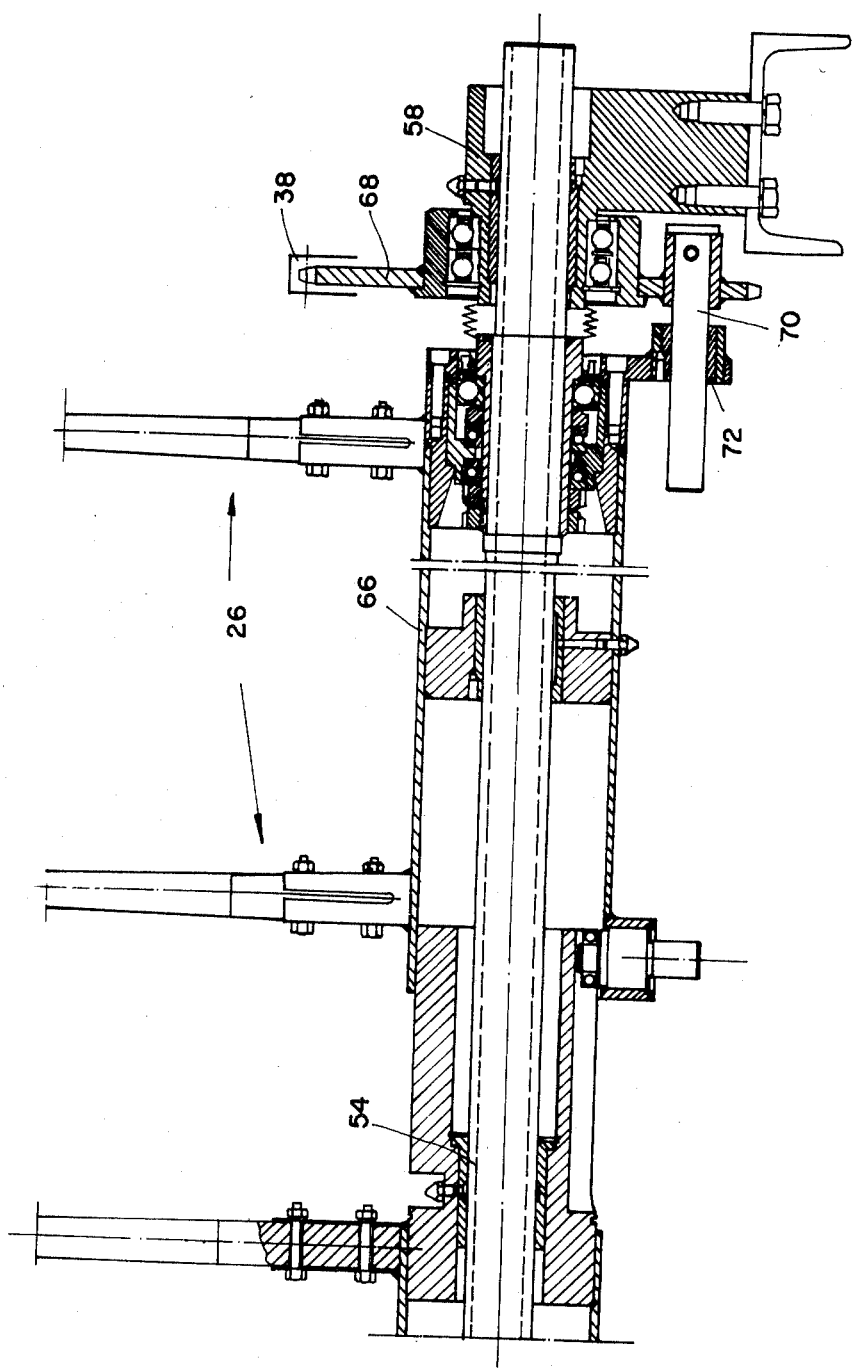
FIG. 3/2

APPARATUS FOR HARVESTING OF JOJOBA BEANS

REFERENCE TO RELATED APPLICATIONS

This is a continuation-in-part of U.S. patent application Ser. No. 410,753, filed Aug. 28, 1982, now abandoned.

FIELD OF THE INVENTION

The present invention relates to harvesting apparatus generally and more particularly to apparatus for harvesting field crops, such as jojoba.

BACKGROUND OF THE INVENTION

The cultivation of the jojoba bean is of increasing economic importance due to the widespread usefullness of the oil contained in the bean. Large scale cultivation of jojoba is being undertaken at a number of locations throughout the world.

One important consideration in determining the viability of a jojoba cultivation project is the cost of harvesting. To date, no commercial harvesting machine is available for this purpose.

It has been proposed to harvest tree fruit, such as citrus, by using a cylindrical array of radially extending tines which are rotated and oscillated in contact with the tree branches for dislodging the fruit. The proposed apparatus employs padded tines and engages only the outer part of the tree at any given time.

SUMMARY OF THE INVENTION

The present invention seeks to provide harvesting apparatus for field crops such as jojoba.

There is thus provided in accordance with an embodiment of the present invention apparatus for harvesting field crops such as jojoba comprising a mobile chassis, an enclosure mounted on the chassis, at least one array of radially extending tines arranged for engagement with growing plants, apparatus for rotating the at least one array, apparatus for oscillating the at least one array, and apparatus mounted on the movable chassis for collecting produce separated from the growing plants by the action of the tines in engagement therewith.

Further in accordance with an embodiment of the invention, the at least one array comprises a plurality of array of tines.

Additionally in accordance with an embodiment of the invention, the at least one array of radially extending tines comprises a generally cylindrical array arranged along a longitudinal axis which defines the axis of rotation thereof as well as the axis of oscillation.

Further in accordance with an embodiment of the present invention the collecting apparatus comprises a bottom collecting surface including a plurality of generally parallel movable plates. According to a preferred embodiment of the invention the plates are movable in their planes to permit passage of stems of growing plants therebetween in gaps formed therebetween. According to a preferred embodiment of the invention, the plates are spring loaded so as to reduce the gaps or eliminate them insofar as possible in the absence of a plant stem thereat. Further in accordance with an embodiment of the invention, the movable plates are slanted so as to cause the produce to slide away from them onto a conveying surface.

Additionally in accordance with a preferred embodiment of the invention, the collecting apparatus comprises a bottom collecting surface disposed below the tines including a plurality of spring loaded pivotahly mounted plates which are notmally urged into partially overlapping arrangement and arranged for sideways movement upon engagement with a living plant member so as to permit relative motion between the harvesting appartus adn the collecting apparatus without uprooting the plant member, the plurality of pivotably mounted plates each defining a generally concave forward edge facing in the predetermined direction of motion of the appartus and a generally convex trailing edge facing in the direction opposite thereto, whereby overlap of the plates is maximized notwithstanding engagement of a growing plant therebetween.

BRIEF DESCRIPTION OF THE DRAWINGS

The present invention will be more fully understood and appreciated from the following detailed description taken in conjunction with the drawings in which:

FIG. 3 is a sectional illustration of a tine array and driving apparatus therefor;

DETAILED DESCRIPTION OF THE INVENTION

Figure 1:
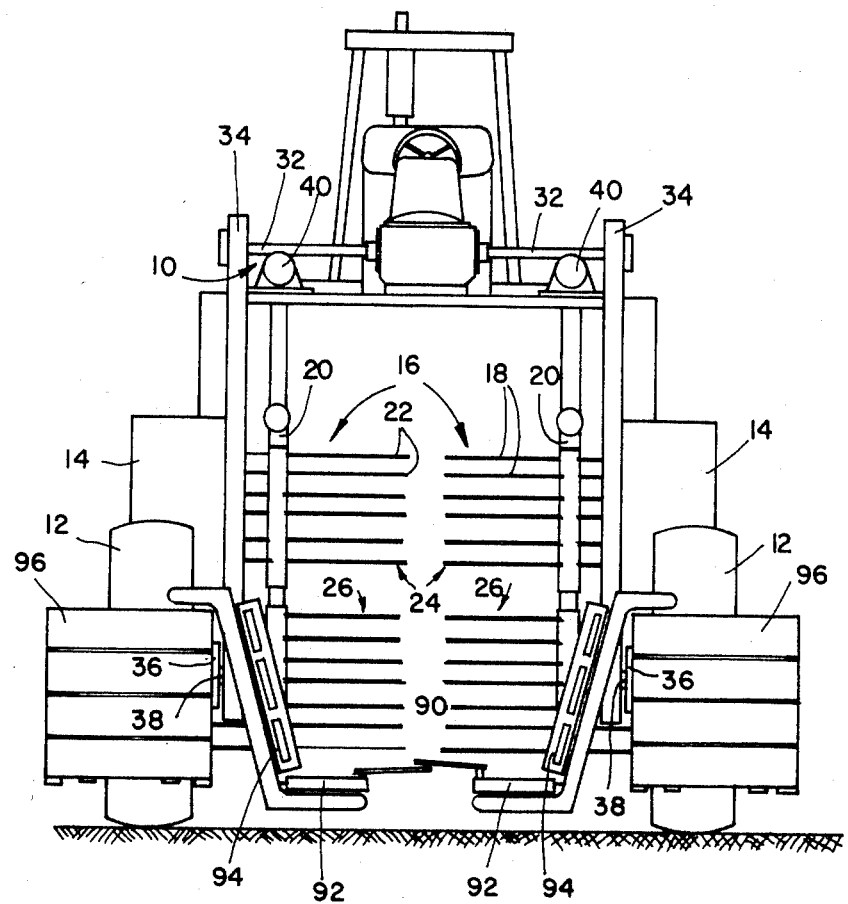
FIG. 1 is a pictorial end view illustration of harvesting apparatus constructed and operative in accordance with an embodiment of the present invention.
Figure 2:
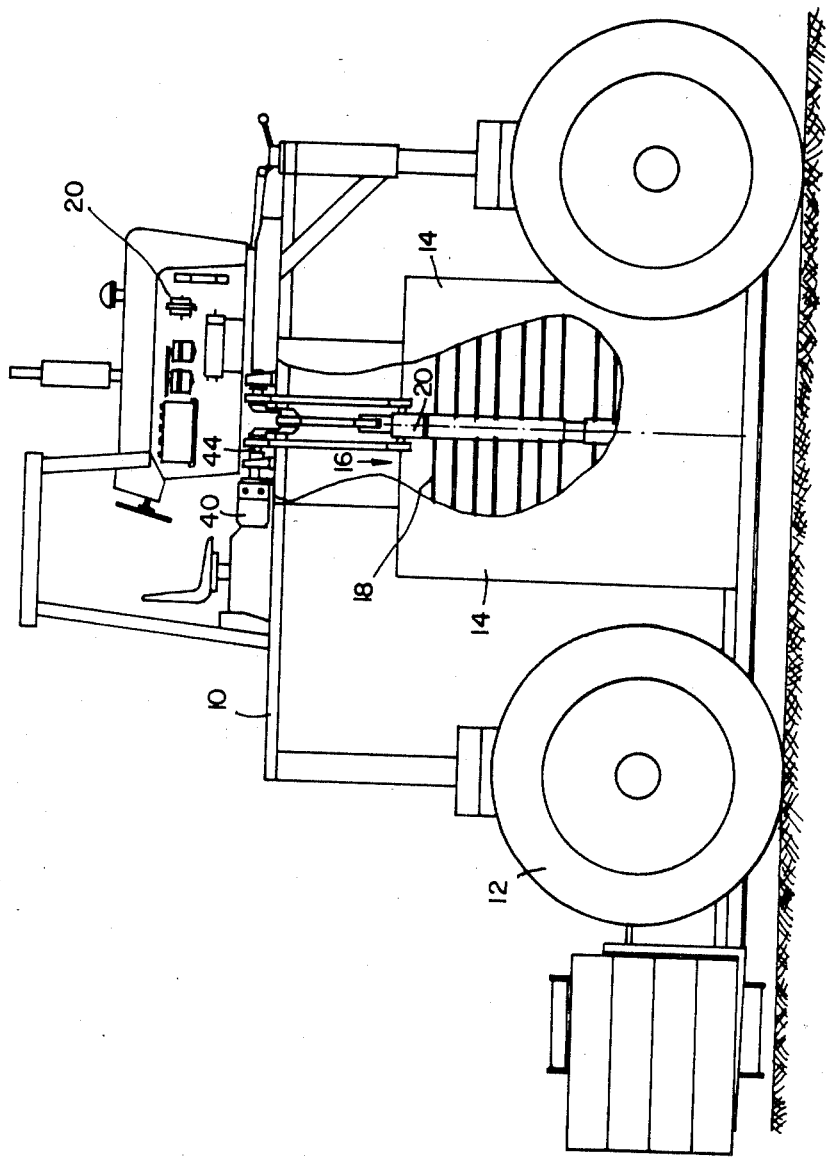
FIG. 2 is a pictorial side view illustration of harvesting apparatus of FIG. 1.

Reference is now made to FIGS. 1 and 2 which illustrate harvesting apparatus constructed and operative in accordance with an embodiment of the present invention and comprising a conventional self propelled chassis 10 supported on four wheels 12. A partial enclosure 14 is mounted onto the chassis and extends along the sides thereof. Disposed within enclosure 14 are first and second arrays 16 of radially extending tines 18.

According to a preferred embodiment of the invention, arrays 16 are formed in a generally cylindrical configuration about a central shaft 20. The tines are typically formed of wood and are 70 cm in length. The spacing between adjacent tips 22 of tines 18 of the two arrays is typically 20 cm. The spacing between adjacent tines in each array is typically 10 cm.

It is noted that a relatively large maximum vertical spacing is provided between upper and lower groups 24 and 26 of tines 18 on each of the arrays.

Reference is now made additionally to FIG. 3 which is a detailed sectional illustration of a tine array and its associated driving apparatus. It is noted from FIGS. 1 and 2 that each tine array is independently mounted on the chassis and is drivingly coupled to a source of rotational energy 30, such as the main or auxiliary motor of the self propelled chassis 10 via drive shafts 32, chain assemblies 34, gears 36 and chain 38 for providing rotational motion of the arrays 16.

Oscillating motion of the tine arrays 16 is provided by means of a pair of independently operated hydraulic motors 40 which are mounted onto chassis 10 and are supplied with hydraulic fluid from a pump (not shown) Each hydraulic motor 40 is coupled to a crank shaft 44 defining respective eccentric crank locations 46, 48 and 50. Crank location 48 is coupled via a crank arm 52 and a rotatable pin 53 to a central shaft 54 for providing axial oscillatory motion thereof. Central shaft 54 is slidably supported onto chassis 10 by means of upper and lower slidable support assemblies 56 and 58.

Crank locations 46 and 50 are coupled to bearing mounted pins 60 and 62 located on opposite sides of an outer sleeve 64 which is axially slidable with respect to central shaft 54. Upper group 24 of tines 18 is fixedly mounted onto outer sleeve 64.

The lower group 26 of tines 18 is fixedly mounted on a lower sleeve 66 which is fixedly mounted onto central shaft 54 and spaced below outer sleeve 64 by a sufficient distance to allow a desired amplitude of relative motion between outer sleeve 64 and lower sleeve 66. Group 26 and the lower sleeve 66 move in 180° out of phase motion with respect to the upper sleeve and group 24 since the central shaft 54 is coupled to crank location 48, which is 180° out of phase with respect to crank locations 46 and 50 to which is coupled the outer sleeve 64. Opposing axial motion of the two groups of tines is thus produced at the same time that the tines are driven in rotational motion about the axis of shaft 54.

Rotational power transfer to shaft 54 is provided by means of a pulley 68 which is bearing mounted onto shaft 54 and driven by a chain 38. Fixed onto pulley 68 at an off axis location is a pin 70 which slidably engages a corresponding socket 72. Socket 72 is fixedly mounted onto lower sleeve 66. It may be appreciated that the provision of a slidable pin and socket assembly as described enables rotational motion to be imparted to the shaft independently of the axial motion thereof.

According to a preferred embodiment of the present invention, the rotational speed of the tines during jojoba harvesting is synchronized with the ground speed of the chassis. The amplitude of oscillation of each of the tine groups is typically 2.0 cm, while the periodicity of their oscillation is typically 750–800 rpm. Further in accordance with a preferred embodiment of the invention, the tines are arranged in an out of phase arrangement on the shafts, thereby to define a plurality of helical patterns of tines which wind around the shaft.

Figure 4:
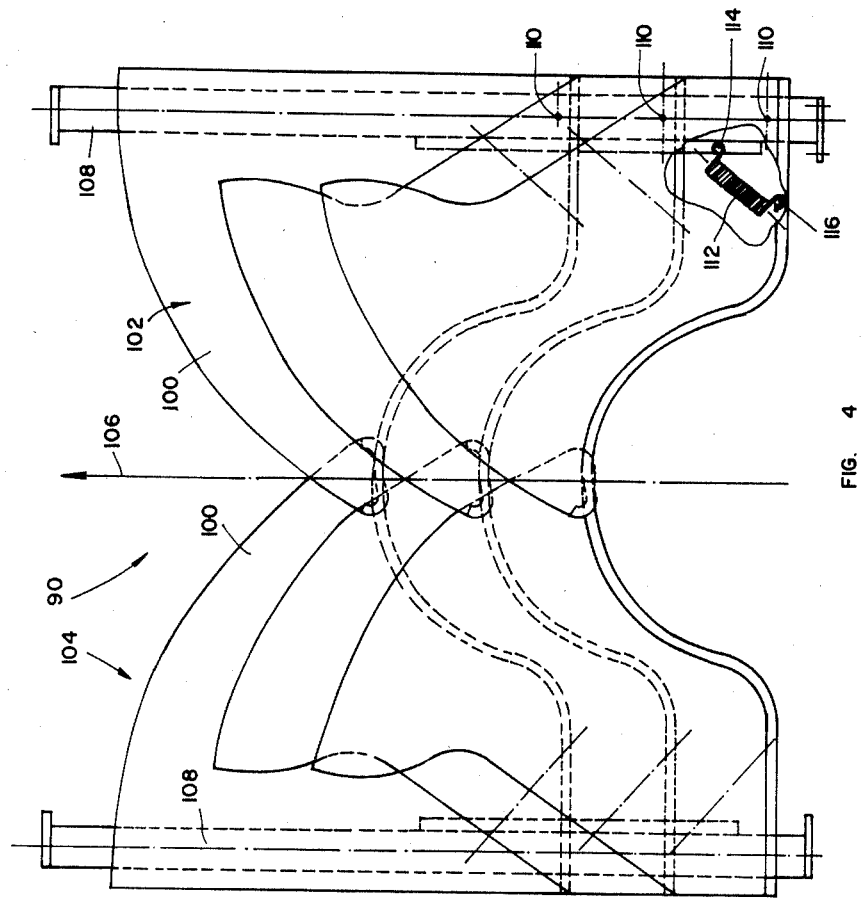
FIG. 4 is a detailed illustration of collecting apparatus constructed and operative in accordance with an embodiment of the present invention.
Figure 5:
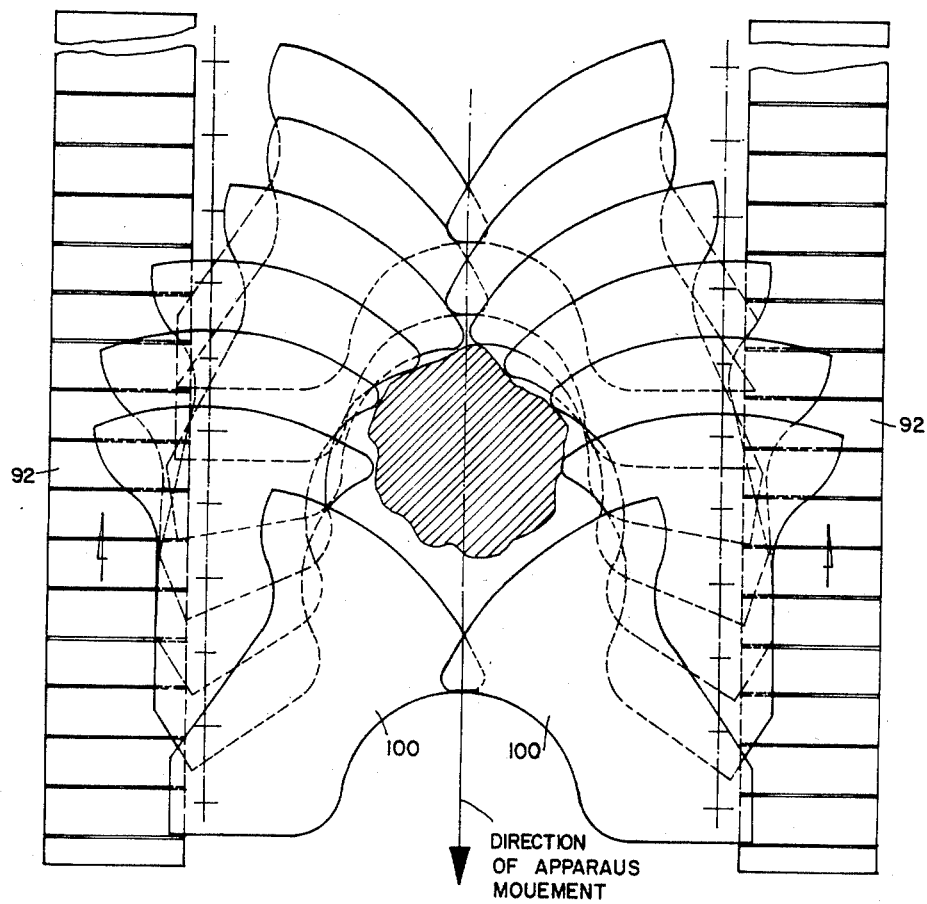
FIG. 5 is a pictorial illustration of the collecting apparatus in a stem engaging orientation.

Referring additionally to FIGS. 4 and 5, there is disposed under tine arrays 16 a collection assembly 90 whose function it is to receive produce falling from a growing plant engaged by tines 18 and to allow the produce to roll or slide onto conveyor belts 92 on either side of the collection assembly 90. Conveyor belts 92 communicate with lifting conveyors 94 on either side of the chassis which feed the harvested produce into containers 96. Containers 96 may be readily removed from the chassis for shipment.

It may be readily appreciated that in the harvest of relatively small produce, such as jojoba beans, it is necessary to prevent the beans from falling through the harvesting apparatus onto the ground surface. Collection assembly 90 is designed to prevent, insofar as possible, the loss of produce while at the same time permitting relatively unimpeded passage of the harvesting apparatus relative to the growing plants without uprooting same.

FIG. 4 illustrates the construction of the collection assembly 90 which comprises a plurality of plate members 100 arranged in normally partially overlapping relationship in two rows 102 and 104. Each of the plate members 100 is formed with a curved surface facing in the direction of motion of the harvesting apparatus, indicated by arrow 106. Each of plates 100 is pivotably mounted onto a side support member 108 at a respective pivot axis 110. A spring 112 is also mounted between a mounting location 114 on side support member 108 and a plate mounting location 116 on each plate member for normally urging each of plate members 100 towards a normally closed orientation as seen in FIG. 4.

The engagement of an object such as a plant stem with plate members 100 causes the plate members to rotate counterclockwise (in the sense of FIG. 4) about their respective pivots, in order to permit the plant stem to enter therebetween. Springs 112 are operative to cause the individual plate members to return to their closed orientation once the physical impediment to their assuming this position is removed.

FIG. 5 illustrates the operation of the collection assembly 90 and the orientation of the collection assembly in the presence of a plant stem 114 in engagement therewith. It is appreciated that the collection assembly is operative to minimize the uncovered region in the vicinity of the plant stem through which produce might fall to the ground surface.

It is appreciated that rows 102 and 104 of plate members are slightly inclined away from the center line therebetween so as to encourage the produce to move towards the region of the side support members 108 and onto side conveyor belts 92.

Figure 6:
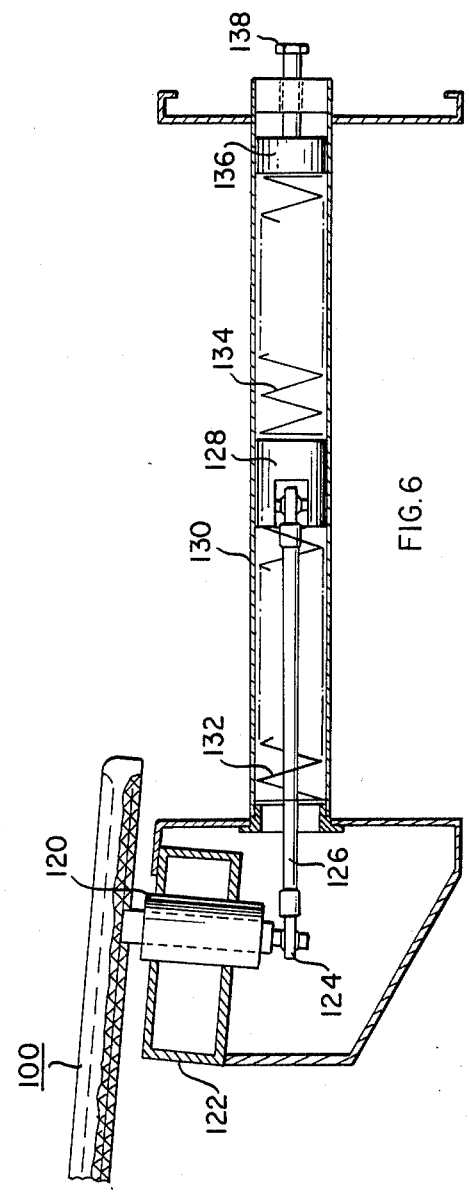
FIG. 6 is a side view, sectional illustration of spring mounting apparatus forming part of the collecting apparatus.
Figure 7:
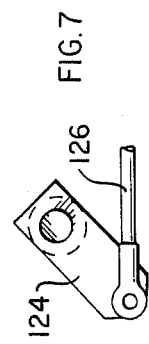
FIG. 7 is a top view illustration of part of the apparatus of FIG. 6.

Reference is now made to FIGS. 6 and 7 which illustrate spring loaded mounting apparatus useful in the collection apparatus of FIGS. 4 and 5, and differing somewhat from the orientation of the spring in the embodiment of FIG. 4. As seen in FIG. 6, each plate member 100 is mounted at a slight angle to the horizontal onto a mounting bearing element 120 which is seated on a chassis member 122. The rotatable shaft of bearing element 120, to which is connected the plate member 100, is connected to an eccentrically mounted arm 124, (FIG. 7), which is in turn rotatably coupled to a connecting rod 126.

Connecting rod 126 is operatively connected to a floating piston 128 which is disposed in a cylinder 130. A first spring 132 is disposed between the front of the cylinder adjacent element 120 and piston 128 and acts to urge plate element 100 towards its fully closed orientation. A second spring 134 lies between the rear of piston 128 and a spring seat 136 disposed at the rear of the cylinder and serves as a shock absorber preventing shock when the plate rotates back to its fully closed orientation after passing out of engagement with a plant stem 114.

The position of spring seat 136 in cylinder 130 is adjustable, as by a manually engageable screw 138 which serves to adjust the initial position of the plate members.

It is appreciated that the mechanism described in above in connection with FIGS. 6 and 7 enables a relatively large angle of rotation, exceeding 90 degrees, of the plate members, thus increasing efficiency of plate coverage.

It will be appreciated by persons skilled in the art that the present invention is not limited by what has been particularly shown and described hereinabove. Rather the scope of the invention is defined only by the claims which follow:

We claim:

1. Apparatus for harvesting field crops such as jojoba comprising:

a mobile chassis;

at least one array of radially extending tines arranged for engagement with growing plants to be harvested and including first and second generally cylindrical arrays of tines mounted on first and second sleeves; and a rotation axle, said first sleeve being fixedly mounted onto said rotation axle at a first axial location therealong and said second sleeve being axially slidably mounted onto said rotation axle at a second location axially disposed from said first location;

power driven means for rotating said at least one array in engagement with said plants about said rotation axle;

means for oscillating said at least one array in engagement with said plants and including a source of rotary power disposed externally of said first and second cylindrical arrays of tines;

a crank shaft coupled to said source of rotary power and disposed externally of said first and second arrays of tines, adjacent to an end of said rotation axle, said crank shaft defining first and second locations thereon whose motion components upon rotation of the crank shaft are opposed; and means for drivingly coupling said first location on said crank shaft to said first sleeve and said second location on said crank shaft to said second sleeve externally of said first and second cylindrical arrays of tines, whereby 180 degree opposed motion of said first and second cylindrical arrays is produced; and means mounted on said chassis for collecting produce separated from said growing plants by the action of said tines in engagement therewith, said collecting means comprising a bottom collecting surface disposed below said at least one array and including a plurality of spring loaded pivotably mounted plates which are normally urged into partially overlapping arrangement and arranged for sideways movement upon engagement with a living plant member so as to permit relative motion between said apparatus and said plant member without uprooting said plant member, said plurality of pivotably mounted plates each defining a generally concave forward edge facing in said predetermined direction and a generally convex trailing edge facing in the direction opposite to said predetermined direction, whereby overlap of the plates is maximized notwithstanding engagement of a growing plant therebetween and wherein said spring loaded pivotably mounted plates comprise spring loading means including:

a shaft fixedly mounted onto each of said plates;

low friction mounting measn for mounting said shaft onto said chassis;

a piston disposed in a cylinder;

a connecting rod coupled to said piston;

eccentric coupling means for connecting said shaft to said connecting rod;

first and second springs associated with said piston in said cylinder, said first spring serving to urge said plate member into its normally closed orientation and said second spring serving to prevent shocks as said plate member moves towards its normally closed orientation after clearing a growing plant.

2. Apparatus according to claim 1 and wherein said plates are inclined away from their center so as to urge produce falling thereon to the side thereof.

3. Apparatus according to claim 1 and wherein said collecting means also comprises conveyor means for receiving fallen produce and for loading it into a collection receptacle.

4. Apparatus according to claim 1 and also including a manually positionable spring seat engaging said second spring for providing adjustability of the position of said plate member in its closed orientation.

* * * * *